(12) United States Patent
Rosenmayer et al.

(10) Patent No.: US 9,108,386 B2
(45) Date of Patent: Aug. 18, 2015

(54) ELASTOMERIC COMPOSITIONS COMPRISING RECLAIMED VULCANIZED ELASTOMER PARTICLES OF BROAD SIZE DISTRIBUTION AND CHEMICALLY MODIFIED VULCANIZED ELASTOMER PARTICLES

(75) Inventors: Charles Rosenmayer, Decatur, GA (US); Frank Papp, Fort Mill, SC (US)

(73) Assignee: Lehigh Technologies, Inc., Tucker, GA (US)

( * ) Notice: Subject to any disclaimer, the term of this patent is extended or adjusted under 35 U.S.C. 154(b) by 266 days.

(21) Appl. No.: 13/492,637

(22) Filed: Jun. 8, 2012

(65) Prior Publication Data

US 2012/0316283 A1      Dec. 13, 2012

Related U.S. Application Data

(60) Provisional application No. 61/494,739, filed on Jun. 8, 2011, provisional application No. 61/525,571, filed on Aug. 19, 2011.

(51) Int. Cl.
| | |
|---|---|
| *C08L 17/00* | (2006.01) |
| *C08L 21/00* | (2006.01) |
| *B32B 5/16* | (2006.01) |
| *C08L 7/00* | (2006.01) |
| *C08L 9/02* | (2006.01) |
| *C08L 19/00* | (2006.01) |
| *C08J 3/12* | (2006.01) |
| *B29B 17/04* | (2006.01) |
| *B29K 21/00* | (2006.01) |

(52) U.S. Cl.
CPC ... *B32B 5/16* (2013.01); *C08J 3/12* (2013.01); *C08L 7/00* (2013.01); *C08L 9/02* (2013.01); *C08L 17/00* (2013.01); *C08L 19/003* (2013.01); *C08L 21/00* (2013.01); *B29B 17/0408* (2013.01); *B29K 2021/00* (2013.01); *C08J 2321/02* (2013.01); *Y10T 428/2982* (2015.01)

(58) Field of Classification Search
CPC ............ C08L 17/00; C08L 21/00; B32B 5/16
USPC ................................................... 524/493, 526
See application file for complete search history.

(56) References Cited

U.S. PATENT DOCUMENTS

| 7,658,387 B2 | 2/2010 | Park | |
|---|---|---|---|
| 7,658,967 B2 | 2/2010 | Dimario | |
| 2002/0086911 A1* | 7/2002 | Rouse et al. | 521/41 |
| 2003/0181547 A1* | 9/2003 | Rouse et al. | 524/16 |
| 2007/0231532 A1 | 10/2007 | Walters et al. | |
| 2011/0178191 A1 | 7/2011 | Marc | |

OTHER PUBLICATIONS

Written Opinion for PCT/US2012/041727 filed on Jun. 8, 2012.

\* cited by examiner

*Primary Examiner* — James J Seidleck
*Assistant Examiner* — Deve E Valdez
(74) *Attorney, Agent, or Firm* — Morris, Manning & Martin, LLP; Daniel E. Sineway, Esq.; Lee Strasburger, Esq.

(57) ABSTRACT

Elastomer compositions comprising uncured elastomer and reclaimed elastomer are described. In one embodiment, the compositions comprise reclaimed elastomer material (micronized rubber powder) of broad particle size distribution, which is less expensive than traditional reclaimed elastomer material with narrow particle size distribution. Further, compositions comprising reclaimed elastomer materials with broad particle size distribution perform comparably to those comprising reclaimed elastomer materials with narrow particle size distribution. In other embodiments, the compositions comprise both vulcanized and devulcanized elastomer materials. Advantageously, by using a combination of vulcanized and devulcanized material, it is possible to incorporate a greater percentage by weight of reclaimed material in to an elastomer composition, thus providing additional cost savings while maintaining high levels of mechanical properties. Further, the use of the reclaimed material reduces landfill waste resulting in a more environmentally friendly product.

40 Claims, No Drawings

ELASTOMERIC COMPOSITIONS COMPRISING RECLAIMED VULCANIZED ELASTOMER PARTICLES OF BROAD SIZE DISTRIBUTION AND CHEMICALLY MODIFIED VULCANIZED ELASTOMER PARTICLES

CROSS-REFERENCE TO RELATED APPLICATION

This application claims benefit under 35 U.S.C. §119(e) of U.S. Provisional Patent Application No. 61/494,739, filed Jun. 8, 2011, and entitled "Rubber Compositions Including Micronized Rubber Powder Having Broad Particle Size Distribution", and U.S. Provisional Patent Application No. 61/525,571, filed Aug. 19, 2011, and entitled "Elastomer Compositions Including Reclaimed Vulcanized Elastomer Particles and Chemically Modified Vulcanized Elastomer Particles", both of which are incorporated herein by reference as if set forth herein in their entireties.

TECHNICAL FIELD

The present disclosure relates generally to elastomer compositions comprising reclaimed elastomer particles, and more particularly, to elastomeric compositions comprising reclaimed elastomer materials (micronized rubber powders or cured rubber particles) with vulcanized and devulcanized (or otherwise chemically modified) elastomer particles, wherein the elastomer particles have a broad and/or varying size distribution.

BACKGROUND

Reclaimed elastomer materials, or "micronized rubber powders" ("MRP"), which include reclaimed vulcanized elastomer particles, are used in a variety of applications, including elastomeric compositions (e.g., tire tread compounds for vehicle tires), plastics compositions (e.g., as fillers for polyolefins), asphalt fillers, and others. In many of these applications, the reclaimed elastomer particles are used as "filler" in place of a portion of the virgin polymer material. One of the primary reasons for the use of vulcanized elastomer particles is cost. Namely, the vulcanized elastomer particles typically are significantly less expensive than virgin (i.e., non-reclaimed) rubber or plastic, and can be used as a "filler" in elastomer or plastic compositions to reduce the overall manufacturing cost of the composition. Further, because vulcanized elastomer particles are typically made from recycled or reclaimed material (e.g., vulcanized scrap from manufacturing processes and used tires or other elastomeric products), reincorporating vulcanized elastomer particles into elastomer and plastic compositions reduces landfill waste and results in a more environmentally-friendly product.

Generally, the vulcanized elastomer particles or MRP used in such reclaimed elastomer materials are small in size (e.g., 2 mm or less in diameter) and are produced in a variety of ways, including by cryogenic grinding, chemical processes, and other methods. As set forth above, the reclaimed elastomer material used to manufacture the particles is typically obtained from previously-manufactured products (e.g., unused or used vehicle tires) or from vulcanized scrap generated during a manufacturing process (e.g., vulcanized scrap generated from the tire manufacturing process).

Conventionally, the compositions of these reclaimed elastomer materials conform to the American Society for Testing and Materials (ASTM) standards (and, specifically, to ASTM D-5603-01 for rubber compounding materials), which classifies materials according to the maximum size of the particles comprising the composition. Generally, particle sizes are classified according to U.S. Standard Mesh sizes (or simply, "mesh"). For example, an 80 mesh particle comprises a diameter of approximately 177 μm, a 140 mesh particle comprises a diameter of approximately 105 μm, a 325 mesh particle comprises a diameter of approximately 44 μm, and so on. U.S. Standard Mesh sizes are readily available from many public sources and are known to those of ordinary skill in the art.

Heretofore, the size of vulcanized elastomer particles in a given classification of reclaimed elastomer material (i.e., micronized rubber powder) tended to centralize around the maximum particle size in the formulation, with little distribution or variation in the size of particles in the particular classification (i.e., the particle size distribution was relatively uniform). Previously, it was assumed that reclaimed elastomer material compositions having a wide range of particle sizes would exhibit poor performance characteristics and would, therefore, be relatively undesirable for many applications. However, producing reclaimed elastomer material compositions with uniform particle size distributions via certain milling processes, such as cryogenic turbo mill processes, can be costly as careful screening, sorting, and distribution of the vulcanized particles is typically necessary.

Further, reclaimed vulcanized elastomer particles are relatively inert and therefore non-reactive with virgin elastomer matrix materials. Therefore, reclaimed elastomer material compositions comprising reclaimed vulcanized elastomer particles are of limited use as filler in rubber or plastic compositions as high levels of the reclaimed vulcanized elastomer particles generally lower the overall physical properties of rubber and plastic compositions. This limitation can be eased by the use of devulcanized elastomer particles, i.e., particles that have undergone a devulcanization treatment or other treatment method (e.g., thermal, mechanical, or chemical) that results in a chemical modification to the surface of the cured elastomer particles. Such chemical modifications to the surface of the reclaimed elastomer particles leads to improved interaction between the reclaimed particles and the virgin elastomer matrix materials. Due to the additional processing involved, however, devulcanized or otherwise chemically modified elastomer particles tend to be more expensive than reclaimed vulcanized elastomer particles.

Therefore, there is a long-felt but unresolved need for elastomeric compositions that comprise reclaimed elastomer material but are less expensive to produce than conventional elastomeric compositions while also retaining mechanical properties comparable to elastomeric compositions containing no reclaimed material.

BRIEF SUMMARY OF THE DISCLOSURE

Briefly described, and according to one embodiment, aspects of the present disclosure generally relate to elastomeric compositions comprising reclaimed vulcanized elastomer materials (micronized rubber powders), wherein the elastomer particles have a broad and/or varying size distribution. For example, elastomeric compositions described herein may comprise reclaimed vulcanized elastomer materials (micronized rubber powders) comprising particles larger than 50 mesh and also smaller than 140 mesh within the same composition. According to one embodiment, these reclaimed vulcanized elastomer materials are used within standard rubber compounds (such as those used for vehicle tires) as replacements for conventional reclaimed vulcanized elastomer materials with relatively uniform particle size distributions that conform to ASTM standards. As described herein, experiments have determined that elastomeric compositions (e.g., tread rubber compounds) incorporating reclaimed vulcanized elastomer materials with broad particle size distributions perform similarly to those comprising traditional reclaimed vulcanized elastomer materials with narrow particle size distributions, but can be produced less expensively.

According to a further embodiment, aspects of the present disclosure also relate to elastomeric compositions comprising both vulcanized and devulcanized (or otherwise chemically treated) reclaimed elastomer materials (micronized rubber powders). For example, elastomeric compositions described herein may comprise 10% of reclaimed vulcanized elastomer material wherein half of the reclaimed elastomer material is vulcanized and half is devulcanized. As will be understood and appreciated, the "devulcanization" process may occur via some chemical modification to the cured/vulcanized particles, or via some functionalization process, etc. As described herein, experiments have determined that elastomeric compositions comprising both vulcanized and devulcanized reclaimed elastomeric materials perform similarly to those comprising only reclaimed vulcanized elastomer material, but can be produced less expensively.

These and other aspects, features, and benefits of the claimed invention(s) will become apparent from the following detailed written description of the preferred embodiments and aspects taken in conjunction with the following drawings and exhibits, although variations and modifications thereto may be effected without departing from the spirit and scope of the novel concepts of the disclosure.

BRIEF DESCRIPTION OF TABLES AND EXHIBITS

The accompanying tables and exhibits illustrate one or more aspects of the disclosure and, together with the written description, serve to explain the principles of the disclosure. Wherever possible, the same reference numbers are used throughout the tables and exhibits, and wherein:

Table 1 displays sample particle size distributions for reclaimed elastomer material compositions (i.e., micronized rubber powders) PD80 and PD84.

Table 2 displays exemplary elastomer composition formulations. The control sample, CTRL_1 contains no reclaimed elastomer material, while both PD80 3% and PD84 3% contain reclaimed elastomer material.

Table 3 displays exemplary elastomer composition formulations. The control sample, CTRL2, contains no reclaimed elastomer material, while each of the remaining samples contains either vulcanized or devulcanized reclaimed elastomer material, or a combination of both.

Table 4 displays exemplary elastomer composition formulations. The control sample, CTRL3, contains no reclaimed elastomer material, while each of the remaining samples contains either vulcanized or devulcanized reclaimed elastomer material, or a combination of both.

Table 5 displays per-pound cost estimates for virgin elastomer material as well as various vulcanized and devulcanized reclaimed elastomer materials.

Table 6 displays tensile testing data relating to the exemplary elastomer compositions detailed in Table 2.

Table 7 displays tensile testing data relating to the exemplary elastomer compositions detailed in Table 3.

Table 8 displays tensile testing data relating to the exemplary elastomer compositions detailed in Table 4.

Exhibit A displays detailed tensile testing data relating to the elastomer compositions detailed in Table 3, which expound on the test results provided in Table 7.

Exhibit B displays detailed tensile testing data relating to the elastomer compositions detailed in Table 4, which expound on the test results provided in Table 8.

DETAILED DESCRIPTION

For the purpose of promoting an understanding of the principles of the present disclosure, reference will now be made to the embodiments illustrated in the tables and attached exhibits, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Various data tables setting forth formulations and experimental results relating to the claimed subject matter are incorporated into this disclosure. Additionally, Exhibits A and B, which present more comprehensive tensile testing data measured by testing samples of the cured elastomer compositions comprising exemplary elastomer formulations, are attached to this disclosure and incorporated herein.

According to one embodiment, aspects of the present disclosure generally relate to elastomeric compositions comprising reclaimed vulcanized elastomer materials (micronized rubber powders), wherein the elastomer particles have a broad and/or varying size distribution. For example, elastomeric compositions described herein may comprise reclaimed vulcanized elastomer materials (micronized rubber powders) comprising particles larger than 50 mesh and also smaller than 140 mesh within the same composition. According to one embodiment, these reclaimed vulcanized elastomer materials are used within standard rubber compounds (such as those used for vehicle tires) as replacements for conventional reclaimed vulcanized elastomer materials with relatively uniform particle size distributions that conform to ASTM standards. As described herein, experiments have determined that elastomeric compositions (e.g., tread rubber compounds) incorporating reclaimed vulcanized elastomer materials with broad particle size distributions perform similarly to those comprising traditional reclaimed vulcanized elastomer materials with narrow particle size distributions, but can be produced less expensively.

According to a further embodiment, aspects of the present disclosure relate to elastomeric compositions comprising both vulcanized and devulcanized (or otherwise chemically treated) reclaimed elastomer materials (micronized rubber powders). For example, elastomeric compositions described herein may comprise 10% of reclaimed vulcanized elastomer material wherein half of the reclaimed elastomer material is vulcanized and half is devulcanized. As will be understood and appreciated, the "devulcanization" process may occur via some chemical modification to the cured/vulcanized particles, or via some functionalization process, etc. As described herein, experiments have determined that elastomeric compositions comprising both vulcanized and devulcanized reclaimed elastomeric materials perform similarly to those comprising only reclaimed vulcanized elastomer material, but can be produced less expensively.

As used herein, the term "vulcanized elastomer particles" includes vulcanized, cured, or otherwise cross-linked elastomeric materials in particulate form. These vulcanized elastomer particles are generally produced via cryogenic grinding processes by grinding reclaimed vulcanized or cross-linked elastomer material (e.g., vehicle tires and scrap from tire manufacturing) into particles, but may be produced in other ways as will occur to one of ordinary skill in the art.

Vulcanized elastomer particles are generally not initially chemically modified. Thus, as used herein, "chemically modified vulcanized elastomer particles" or "devulcanized elastomer particles" or "functionalized elastomer particles" include vulcanized, cured, or otherwise cross-linked elastomeric materials in particulate form that have been subjected to a treatment which results in a chemical modification of the surface of the particle. For example, vulcanized elastomer particles can be subjected to a chemical or thermal treatment to modify the chemistry of the particle surface. Such chemical treatment typically aids in the subsequent cross-linking of the devulcanized elastomer particles to native elastomer and other materials.

Further, as used herein and recited in the attached exhibits, the term "PolyDyne" or "PD" refers to a brand name of vulcanized elastomer particles (e.g., cured rubber particles, recycled rubber particles, or micronized rubber powder) produced by Lehigh Technologies, Inc. of Tucker, Ga. According to one embodiment, the particles described herein are produced via a cryogenic grinding system described by U.S. Pat. No. 7,445,170, entitled Process and Apparatus for Manufacturing Crumb and Powder Rubber, and an impact mill as described by U.S. Pat. No. 7,861,958, entitled Conical-Shaped Impact Mill. In certain embodiments of the present disclosure, these micronized rubber powders are not subjected to subsequent screening or sorting operations to group the particles into narrowly-distributed ranges based on particle size, thus resulting in particle groupings of broad size.

As also used herein and recited in the attached exhibits, "PD80" generally refers to a reclaimed elastomer material composition (i.e., micronized rubber powder) conforming to conventional 80 mesh standards. The term "PD84" generally refers to a reclaimed elastomer material composition (as described herein) having a broad distribution of particle sizes (and not conforming to any specific ASTM standards). Thus, PD80 and PD84 are proprietary brand names used to describe specific reclaimed elastomer material compositions (micronized rubber powders) produced by Lehigh Technologies, Inc., which have predetermined particle size distributions. As will be described in more detail herein, PD84 corresponds to a proprietary composition of particles having a broad particle size distribution. As will be understood and appreciated, the specific formulations and particle size distributions associated with PD80 and PD84 as described in the attached exhibits are presented purely for illustrative purposes, and elastomeric compositions, reclaimed elastomer material compositions, or other elastomer formulations contemplated by the present disclosure are not limited to the specific characteristics or features recited herein.

Sample particle size distributions for PD80 and PD84 are shown in Table 1 below. As shown in Table 1, PD84 comprises a broader distribution of particle sizes as compared to PD80. For example, the exemplary PD84 includes a trace amount of 40 mesh particles, approximately 9% by weight 60 mesh particles, approximately 21% by weight 80 mesh particles, approximately 38% by weight 120 mesh particles, approximately 12% by weight 140 mesh particles, and approximately 20% by weight particles that are smaller than 140 mesh. In contrast, the exemplary PD80 composition comprises no 40 mesh particles, only trace amounts of 60 mesh particles, approximately 3% by weight 80 mesh particles, approximately 52% by weight 120 mesh particles, approximately 18% by weight 140 mesh particles, and approximately 27% by weight particles that are smaller than 140 mesh. As shown, the particle sizes in the exemplary PD84 composition are distributed more evenly over a wider range of particle sizes, whereas in the PD80 composition, particles are primarily grouped around a central particle size (i.e., greater than 50% by weight are approximately 120 mesh particles).

TABLE 1

Particle Size Distribution for PD80 and PD84 Samples

| Sieve ("mesh") (μm) | PD80 actual % | PD84 actual % | PD84 range % |
|---|---|---|---|
| 40 (400) | | <1 | <1 |
| 60 (600) | <1 | 9 | 7-10 |
| 80 (800) | 3 | 21 | 19-23 |
| 120 (125) | 52 | 38 | 35-42 |
| 140 (105) | 18 | 12 | 11-14 |
| −140 (pan) | 27 | 20 | 20-30 |

As noted previously, it heretofore was assumed that reclaimed elastomer materials having a wide range of particle sizes (e.g., PD84) would exhibit poor performance characteristics and would, therefore, be relatively undesirable for many applications (e.g., elastomeric compositions, plastics compositions, etc.). To show that reclaimed elastomer materials having a wide range of particle sizes (which are cheaper and easier to produce) were suitable for elastomeric compositions (e.g., tire tread compositions), sample elastomer formulations comprising traditional elastomer material (e.g., PD80) and with broad particle size range (e.g., PD84) were produced so that their performance characteristics could be tested and compared to each other and to control samples comprising no reclaimed material.

Below, Table 2 displays an exemplary sample control formulation ("CTRL"), which does not include any reclaimed elastomer material. In addition, Table 2 shows exemplary formulations comprising 3% by weight reclaimed elastomer material (i.e., "PD80 3%" and "PD84 3%, respectively). As described in greater detail below, Table 2 (as well as Tables 3 and 4, described infra) shows other components or ingredients used in these exemplary rubber recipes/formulations, including native elastomer material, sulfurs, accelerators, and various other filler materials.

TABLE 2

Exemplary Formulations With and Without Reclaimed Elastomer Material

| Exemplary Elastomer Composition | CTRL_1 | PD80 3% | PD84 3% |
|---|---|---|---|
| Units | PHR | PHR | PHR |
| ESBR1500 (Non-oil extended) | 70.00 | 70.00 | 70.00 |
| High Cis PBR | 30.00 | 30.00 | 30.00 |
| PD80 | | 6.49 | |
| PD84 | | | 6.49 |
| Heavy Naphthenic Process Oil | 25.00 | 25.00 | 25.00 |
| Homogenizing Agent | 1.00 | 1.00 | 1.00 |
| Alkyl Phenol Formaldehyde Novalak Tack Resin | 3.00 | 3.00 | 3.00 |
| N339 Carbon Black | 65.00 | 65.00 | 65.00 |
| 6PPD Antidegradant | 2.50 | 2.50 | 2.50 |
| TMQ Antidegradant | 1.50 | 1.50 | 1.50 |
| Microcrystalline and Paraffin Wax Blend | 2.50 | 2.50 | 2.50 |
| Zinc Oxide Dispersion (85% ZnO) | 3.53 | 3.53 | 3.53 |

TABLE 2-continued

Exemplary Formulations With and Without Reclaimed Elastomer Material

| Exemplary Elastomer Composition | CTRL_1 | PD80 3% | PD84 3% |
|---|---|---|---|
| Stearic Acid | 2.00 | 2.00 | 2.00 |
| TBBS | 1.00 | 1.00 | 1.00 |
| Sulfur Dispersion (80% Sulfur) | 2.50 | 2.50 | 2.50 |
| Retarder CTP | 0.10 | 0.10 | 0.10 |
| Total PHR Finish Batch | 209.63 | 216.12 | 216.12 |

Likewise, as was also noted previously, reclaimed vulcanized elastomer particles (e.g., PD80 or PD84) are relatively inert and therefore non-reactive with virgin elastomer matrix materials. As such, high levels of reclaimed vulcanized elastomer particles are of limited use in elastomeric compositions as they generally lower the compositions' overall physical properties. Devulcanized reclaimed elastomer materials, however, have improved interaction with virgin elastomer material. Therefore, to ameliorate the limitation resulting from the non-reactiveness of the reclaimed vulcanized elastomer particles and allow for elastomeric compositions comprising higher levels of reclaimed material, which are both cheaper and easier to produce, sample elastomer formulations comprising both vulcanized and devulcanized reclaimed elastomer material ("combination formulations") were developed. Various exemplary combination formulations are displayed in Tables 3 and 4, below, along with control formulations with no reclaimed material, samples containing only vulcanized or devulcanized reclaimed material (but not both).

As in Table 2, Table 3 includes an exemplary sample control formulation ("CTRL1"), which contains no reclaimed elastomer material, and various other formulations comprising reclaimed elastomer material. In addition to a second exemplary formulation with 3% PD84 reclaimed material ("PD84_2 3%"), Table 3 also includes a first exemplary formulation comprising 6% PD84 reclaimed material ("PD84 6%"). Further, Table 3 includes exemplary sample formulations comprising both PD84 and a devulcanized elastomer (i.e., "SRI80") as a reclaimed elastomer component, ("PD84 3%+SRI80 3%" and "PD84 6%+SRI80 4%") and exemplary formulations comprising only devulcanized elastomer (SRI80) as a reclaimed elastomer component (i.e., "SRI80 3%" and "SRI80 6%"). As referred to herein, "SRI80" refers to an exemplary type of devulcanized reclaimed elastomer material (e.g., functionalized or chemically modified reclaimed elastomer material), that was obtained from Sekhar Research Innovations, having a principal place of business in Malaysia, using PD80 manufactured by Lehigh Technologies, Inc. as the vulcanized particulate feedstock. As will be understood and appreciated, SRI80 is simply one type of devulcanized elastomer material that can be utilized within embodiments of the present formulations or compositions, and aspects of the present disclosure are not intended to be limited in any way to use of a specific chemically modified elastomer material.

TABLE 3

Exemplary Formulations With and Without Reclaimed Elastomer Material

| Exemplary Elastomer Composition | CTRL_2 | PD84_2 3% | PD84 6% | PD84 3% + SRI80 3% | PD84 6% + SRI80 4% | SRI80 3% |
|---|---|---|---|---|---|---|
| | | | | Units | | |
| | PHR | PHR | PHR | PHR | PHR | PHR |
| ESBR1500 (Non-oil extended) | 40.00 | 40.00 | 40.00 | 40.00 | 40.00 | 40.00 |
| SBR Black Masterbatch | 67.50 | 67.50 | 67.50 | 67.50 | 67.50 | 67.50 |
| High Cis PBR | 30.00 | 30.00 | 30.00 | 30.00 | 30.00 | 30.00 |
| SRI 80 | | | | 6.52 | 9.09 | 6.30 |
| PD84 | | 6.30 | 13.03 | 6.52 | 13.64 | |
| Heavy Naphthenic Process Oil | 5.00 | 5.00 | 5.00 | 5.00 | 5.00 | 5.00 |
| Homogenizing Agent | 1.00 | 1.00 | 1.00 | 1.00 | 1.00 | 1.00 |
| Alkyl Phenol Formaldehyde Novalak Tack Resin | 3.00 | 3.00 | 3.00 | 3.00 | 3.00 | 3.00 |
| N339 Carbon Black | 42.50 | 42.50 | 42.50 | 42.50 | 42.50 | 42.50 |
| 6PPD Antidegradant | 2.00 | 2.06 | 2.13 | 2.13 | 2.22 | 2.06 |
| TMQ Antidegradant | 1.00 | 1.03 | 1.09 | 1.09 | 1.14 | 1.03 |
| Microcrystalline and Paraffin Wax Blend | 2.00 | 2.06 | 2.13 | 2.13 | 2.22 | 2.06 |
| Zinc Oxide Dispersion (85% ZnO) | 3.53 | 3.53 | 3.53 | 3.53 | 3.53 | 3.53 |
| Stearic Acid | 2.00 | 2.00 | 2.00 | 2.00 | 2.00 | 2.00 |
| TBBS | 1.00 | 0.95 | 0.90 | 0.90 | 0.85 | 0.95 |
| DPG | 0.10 | 0.10 | 0.10 | 0.10 | 0.10 | 0.10 |
| Sulfur Dispersion (80% Sulfur) | 2.75 | 2.96 | 3.16 | 3.16 | 3.44 | 2.96 |
| Retarder CTP | 0.10 | 0.10 | 0.10 | 0.10 | 0.10 | 0.10 |
| Total PHR Finish Batch | 203.48 | 210.08 | 217.17 | 217.17 | 227.33 | 210.08 |

Table 4 displays further exemplary sample formulations for elastomer compositions. Table 4 includes one exemplary sample formulation comprising two reclaimed vulcanized elastomer materials ("PD84 3%+PD140 7%"). In addition, Table 4 includes three exemplary sample formulations comprising both vulcanized and devulcanized reclaimed elastomer material ("PD84 3%+LG80 7%", "PD84 3%+LG80 12%", and "PD140 5%+LG80 10%"). Finally, Table 4 displays an exemplary formulation comprising a devulcanized elastomer as the only reclaimed elastomer material ("LG80 10%"). As referred to herein, "LG80" refers to an exemplary type of devulcanized reclaimed elastomer material (e.g., functionalized or chemically modified reclaimed elastomer material), that was obtained from Levgum, Ltd., having a principal place of business in Kanot, Israel, using PD80 manufactured by Lehigh Technologies, Inc. as the vulcanized particulate feedstock. As will be understood and appreciated, LG80 is simply one type of devulcanized elastomer material that can be utilized within embodiments of the present formulations or compositions, and aspects of the present disclosure are not intended to be limited in any way to use of a specific chemically modified elastomer material.

Each of the exemplary sample formulations listed above included a styrene butadiene rubber (SBR1500), and, in certain cases, an SBR Black Masterbatch which includes SBR, carbon black and an aromatic oil) and a cis-1,4-polybutadiene synthetic rubber. The virgin or unvulcanized elastomer component of these formulations is therefore a mixture of SBR and cis-1,4-polybutadiene. Each of the compositions also included carbon black as a filler (N339) and other conventional rubber additives. These components were mixed together to form a masterbatch to which sulfur, n-tert-butyl-2 benzothiazolesulfenamide (TBBS) and, in certain cases, diphenyl guanidine (DPG) were added. TBBS and DPG are accelerators for the vulcanization reaction. A retarder N-(cyclohexylthio)phthalimide (CTP) was also added to the formulations to retard the onset of the curing reaction. The accelerator/retarder package used in the examples is merely exemplary and other known accelerators/retarders can also be used. As will be understood and appreciated, the compositions shown and described in Tables 2-4 are provided for exemplary and illustrative purposes only, and are in no way intended to limit the scope of the present disclosure.

TABLE 4

Additional Exemplary Formulations With Reclaimed Elastomer Material

| Exemplary Elastomer Composition | CTRL_3 | PD84 3% + PD140 7% | PD84 3% + LG80 7% | PD84 3% + LG80 12% | PD140 5% + LG80 10% | LG80 10% OPT |
|---|---|---|---|---|---|---|
|  | PHR | PHR | PHR | PHR | PHR | PHR |
| ESBR1500 (Non-oil extended) | 40.00 | 40.00 | 40.00 | 40.00 | 40.00 | 40.00 |
| SBR Black Masterbatch | 67.50 | 67.50 | 67.50 | 67.50 | 67.50 | 67.50 |
| High Cis PBR | 30.00 | 30.00 | 30.00 | 30.00 | 30.00 | 30.00 |
| PD84 |  | 6.80 | 6.80 | 7.20 |  |  |
| PD140 |  | 15.88 |  |  | 12.00 |  |
| Levgum 80 |  |  | 15.88 | 28.81 | 24.01 | 22.68 |
| Heavy Naphthenic Process Oil | 5.00 | 5.00 | 5.00 | 5.00 | 5.00 | 5.00 |
| Homogenizing Agent | 1.00 | 1.00 | 1.00 | 1.00 | 1.00 | 1.00 |
| Alkyl Phenol Formaldehyde Novalak Tack Resin | 3.00 | 3.00 | 3.00 | 3.00 | 3.00 | 3.00 |
| N339 Carbon Black | 42.50 | 42.50 | 42.50 | 42.50 | 42.50 | 42.50 |
| 6PPD Antidegradant | 2.00 | 2.00 | 2.00 | 2.00 | 2.00 | 2.00 |
| TMQ Antidegradant | 1.00 | 1.00 | 1.00 | 1.00 | 1.00 | 1.00 |
| Microcrystalline and Paraffin Wax Blend | 2.00 | 2.00 | 2.00 | 2.00 | 2.00 | 2.00 |
| Zinc Oxide Dispersion (85% ZnO) | 3.53 | 3.53 | 3.53 | 3.53 | 3.53 | 3.53 |
| Stearic Acid | 2.00 | 2.00 | 2.00 | 2.00 | 2.00 | 2.00 |
| TBBS | 1.00 | 0.85 | 0.85 | 0.75 | 0.75 | 0.85 |
| DPG | 0.10 | 0.10 | 0.10 | 0.10 | 0.10 | 0.10 |
| Sulfur Dispersion (80% Sulfur) | 2.75 | 3.44 | 3.44 | 3.78 | 3.78 | 3.44 |
| Retarder CTP | 0.10 | 0.10 | 0.10 | 0.10 | 0.10 | 0.10 |
| Total PHR Finish Batch | 203.48 | 226.70 | 226.70 | 240.27 | 240.27 | 226.70 |

The various exemplary formulations were used to form 6"×6"×0.080" elastomer sheets for testing purposes according to known and conventional rubber curing processes. The sheets were cured for 20 minutes at 160° C. Tensile testing samples were cut from the cured sheets and five samples or specimens of each formulation were evaluated. In particular, break stress/tensile strength at break, 300% modulus, elongation at break/strain at break, and hardness were measured for each sample. Average values for each test result are displayed in Tables 6-8, which follow.

Further, rebound was measured for each sample. Rebound is an indicator of rolling resistance, specifically for elastomeric compositions used as tire tread compounds for vehicle tires. Rolling resistance is a factor in determining fuel economy, and therefore, elastomer formulations with higher rebound values are preferred. Average values for rebound are likewise displayed in Tables 6-8.

Additionally, the "normalized tensile quality" was calculated for each of the samples. Normalized tensile quality (or "NTQ") is a proprietary measure used as a means for quickly comparing the tensile properties of a test sample to a control sample. The NTQ measure takes into account the test results for break stress, 300% modulus, and elongation at break for a test sample relative to the same results for a control. Specifically, NTQ can be defined as the product of break stress, modulus, and elongation for a specific sample divided by the product of the same test values for a control compound. Specifically:

$$NTQ = (\text{sample break stress} * \text{sample modulus} * \text{sample elongation}) / (\text{control break stress} * \text{control modulus} * \text{control elongation})$$

By definition, a normalized tensile rating of 100 indicates a sample comprising no reclaimed elastomer material (i.e., the control samples used in testing). As such, normalized tensile ratings closer to 100 typically suggest a sample with tensile properties akin to a control sample. The normalized tensile quality of each sample is displayed in Tables 6-8.

Finally, relative costs were calculated for each of the controls and samples using the per-pound cost estimates for virgin elastomer material as well as vulcanized and devulcanized reclaimed elastomer material, as shown in Table 5, below. Generally, relative cost serves to illustrate the cost savings associated with replacing virgin matrix/elastomer material with reclaimed elastomer material in an elastomeric composition. As will be understood and appreciated, the relative cost information provided in Tables 5-8 is provided for exemplary purposes only to demonstrate the cost benefits associated with embodiments of the present compositions and formulations, and is not way intended to limit the scope of the present disclosure.

TABLE 5

Per-Pound Cost Estimates for Various Elastomer Materials
Cost Estimates, $/lb

| Material | Cost |
|---|---|
| Control | $1.50 |
| PD84 | $0.40 |
| PD80 | $0.50 |
| PD140 | $0.85 |
| SRI80 | $0.70 |
| LG80 | $0.70 |

Table 6 shows the test results for a control sample containing no reclaimed elastomer material as well as the results for two formulations comprising reclaimed vulcanized elastomer material. The particle size distributions for both PD84 3% and PD80 3% were explicitly detailed in Table 2, above.

TABLE 6

Test Results (Samples Comprising Reclaimed Vulcanized Material with Broad Particle Size Distribution and Uniform Particle Size)

| Table 6 Results | Control | PD84 3% | PD80 3% |
|---|---|---|---|
| Tensile RT (MPa) | 15.2 | 13.1 | 13.2 |
| M 300% RT (MPa) | 6.9 | 6.5 | 6.4 |
| Elongation % | 689 | 636 | 654 |
| Normalized Tensile Quality | 100 | 75.4 | 77.4 |
| Hardness RT (Type A) | 68.9 | 69.7 | 69.0 |
| Rebound @ 70° C. | 46.0 | 45.2 | 45.1 |
| Relative Cost | 100.0 | 97.8 | 98.0 |

As shown in the table, the sample with broad particle size range (PD84 3%) performed comparably to the sample with narrow particle size range (PD80 3%). The samples had high normalized tensile quality (75.4 and 77.4, respectively), with a relative difference[1] of approximately 2.67%. The hardness and rebound test results were likewise comparable with relative differences of 1.0% and 0.22%. Such results are unexpected since, as noted previously, it had been assumed that elastomeric compositions comprising reclaimed elastomer material having a broad range of particle sizes would exhibit poor performance characteristics as compared to elastomeric compositions comprising reclaimed elastomer material having uniform particle size. Additionally, as shown in Table 5, PD84 3%, which comprises reclaimed vulcanized material with a broad range of particle sizes, has a lower relative cost (97.8) than the PD80 3% sample (98.0).

Relative difference was calculated as: $[|x-y|/(|x+y|/2)]*100$

The results displayed in Table 6 are significant as they demonstrate that formulations comprising reclaimed vulcanized elastomer material display performance characteristics comparable to formulations comprising no reclaimed material. Further, and more significantly, the Table 6 results demonstrate that samples comprising reclaimed elastomer material with broad particle range (i.e., PD84) performed comparably to those comprising more traditional reclaimed elastomer material, PD80 in this case. These results are advantageous as the reclaimed material with broad particle range offers lower relative cost and is significantly easier and cheaper to manufacture as it does not require extensive screening, sorting, and distribution of particles as is typically necessary for reclaimed elastomer material compositions with uniform particle size distributions such as PD80.

Similarly to Table 6, Table 7 displays test results for a control sample containing no reclaimed elastomer material as well as the results for two formulations comprising reclaimed vulcanized elastomer material, both with broad particle size range (PD84_2 3% and PD84 6%). Additionally, Table 7 shows results for samples comprising a combination of vulcanized and devulcanized reclaimed elastomer material (PD84 3% & SR180 3% and PD84 6% & SR180 4%). Finally, Table 7 shows results for a sample comprising reclaimed devulcanized elastomer material but no reclaimed vulcanized elastomer material (SRI80 3%).

TABLE 7

Test Results (Samples Comprising Reclaimed Vulcanized Material and Reclaimed Devulcanized Material)

| Table 7 Results | Control_2 | PD84_2 3% | PD84 6% | PD84 3% & SRI80 3% | PD84 6% & SRI80 4% | SRI80 3% |
|---|---|---|---|---|---|---|
| Tensile RT (MPa) | 17.1 | 15.0 | 14.7 | 15.0 | 14.6 | 16.5 |
| M 300% RT (MPa) | 8.8 | 8.6 | 8.5 | 8.6 | 8.5 | 8.6 |
| Elongation % | 608 | 542 | 540 | 539 | 537 | 598 |
| Normalized Tensile Quality | 100 | 76.9 | 74.1 | 76.3 | 72.9 | 92.7 |
| Hardness RT (Type A) | 69.6 | 69.8 | 69.7 | 70.2 | 70.2 | 69.5 |
| Rebound @ 70° C. | 49.4 | 48.6 | 48.3 | 48.5 | 47.7 | 48.8 |
| Relative Cost | 100.0 | 97.8 | 95.6 | 96.2 | 93.5 | 98.4 |

Likewise, Table 8 displays results for a control sample with no reclaimed elastomer material as well as a sample comprising a combination of reclaimed vulcanized elastomer materials (PD84 3% & PD140 7%). Additionally, Table 8 displays results for samples comprising a combination of vulcanized and devulcanized reclaimed elastomer material (PD84 3% & LG80 7%, PD84 3% & LG80 12%, and PD140 5% & LG80 10%). Table 8 also displays test results for a sample comprising reclaimed devulcanized material but no reclaimed vulcanized material.

TABLE 8

Additional Test Results (Samples Comprising Reclaimed Vulcanized Material and Reclaimed Devulcanized Material)

| Table 8 Results | Control_3 | PD84 3% & PD140 7% | PD84 3% & LG80 7% | PD84 3% & LG80 12% | PD140 5% & LG80 10% | LG80 10% |
|---|---|---|---|---|---|---|
| Tensile RT (MPa) | 17.3 | 16.0 | 16.4 | 16.1 | 16.5 | 16.2 |
| M 300% RT (MPa) | 8.6 | 8.6 | 8.8 | 9.4 | 9.0 | 9.2 |
| Elongation % | 630 | 573 | 577 | 521 | 558 | 537 |
| Normalized Tensile Quality | 100 | 83.9 | 88.5 | 84.8 | 89.0 | 85.8 |
| Hardness RT (Type A) | 73.0 | 71.5 | 72.0 | 72.0 | 72.3 | 71.9 |
| Rebound @ 70° C. | 48.6 | 47.9 | 49.1 | 49.6 | 48.9 | 48.3 |
| Relative Cost | 100.0 | 94.8 | 94.1 | 91.4 | 92.5 | 94.7 |

As an initial point, Table 7 illustrates that elastomer compositions comprising higher percentages of reclaimed vulcanized elastomer material demonstrated diminished performance characteristics as compared to samples comprising lower percentages of reclaimed vulcanized elastomer material. Specifically, PD84 6% had a normalized tensile quality of 74.1, which was a relative difference of 3.71 as compared to the PD84_2 3% sample. As discussed previously, this limitation can be ameliorated by incorporating a combination of vulcanized and devulcanized reclaimed elastomer material in to an elastomer composition.

As Tables 7 and 8 further illustrate, samples comprising reclaimed vulcanized elastomer material exhibit normalized tensile quality that is adequate and acceptable for most commercial applications, but with significant cost savings over conventional formulations with no reclaimed vulcanized elastomer material, particularly samples comprising combinations of vulcanized and devulcanized reclaimed elastomer material ("combination samples").

Looking at Table 7, combination sample PD84 3% & SRI80 3%, which had an NTQ of 76.3, outperformed PD84 6% (NTQ of 74.1, relative difference of 3.71). Both samples comprised 6% by weight of reclaimed elastomer material, but the combination sample included both vulcanized and devulcanized material, thus demonstrating the advantage of combining vulcanized and devulcanized material. The PD84 3% & SRI80 3% combination sample did, however, have a higher relative cost than the PD84 6% sample, as shown in Table 7.

The combination samples in Table 8 (i.e., PD84 3% & LG80 7%, PD84 3% & LG80 12%, and PD140 5% & LG80 10%), on the other hand, which comprise between 10% and 15% by weight of reclaimed elastomer material, performed comparably to the control sample, which comprises no reclaimed elastomer material. Likewise, the combination samples shown in Table 8 significantly outperformed the samples comprising only vulcanized reclaimed elastomer material.

In particular, the PD84 3% & LG80 7%, which comprises 10% by weight of reclaimed material, had an NTQ of 88.5 and relative cost of 94.1, a relative difference of 14.03 and 3.86, respectively, as compared to the PD84_2 3% sample, which comprises only 3% of reclaimed material. Similarly, PD84 3% & LG80 12%, which comprises 15% by weight of reclaimed material, had an NTQ of 84.8 and relative cost of 91.4, a relative difference of 9.77 and 6.77, respectively, as compared to the PD84_2 3%. In each case, the results are advantageous as the Table 8 combination samples perform comparably to the control samples and also offer cost savings. Further, as the combination samples incorporate reclaimed elastomer material with broad particle size distribution (i.e., PD84), there is a resultant savings in manufacturing cost.

The results presented in the foregoing tables illustrate several advantages of utilizing reclaimed elastomer material compositions with wide particle size ranges in various elastomeric compositions. As noted, it was previously assumed that incorporation of reclaimed elastomer materials with wide particle size ranges (e.g., PD84) into elastomeric compositions would lead to poor performance characteristics as compared to more traditional reclaimed elastomer materials with narrow particle size ranges (e.g., PD80). The Table 2 test results show, however, that samples incorporating materials with wide particle size ranges perform comparably to more traditional samples. Further, as noted previously, reclaimed elastomer materials with wide particle size ranges offer a cost savings over the more traditional materials with narrow particle range, and they are likewise easier to manufacture.

The results also illustrate that it by using a combination of vulcanized and devulcanized reclaimed elastomer material, is possible to incorporate higher percentages of reclaimed elastomer material in to elastomer compositions while maintaining sufficient performance characteristics, which likewise leads to greater cost savings and ease in manufacturing.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope.

What is claimed is:

1. A micronized elastomer powder formulation for use in manufacturing a vulcanized elastomer product, comprising:
    a plurality of cured elastomer particles, wherein the plurality of cured elastomer particles comprise at least 1% by weight particles of size greater than or equal to 50 mesh, and wherein the plurality of cured elastomer particles comprise at least 20% by weight particles of size less than or equal to 140 mesh.

2. The micronized elastomer powder formulation of claim 1, wherein the plurality of cured elastomer particles comprise a plurality of cured rubber particles.

3. The micronized elastomer powder formulation of claim 1, further comprising uncured elastomer material.

4. The micronized elastomer powder formulation of claim 3, wherein the uncured elastomer material comprises styrene butadiene, polybutadiene, natural rubber, nitrile rubber, butyl rubber, and combinations thereof.

5. The micronized elastomer powder formulation of claim 1, further comprising a crosslinking agent.

6. The micronized elastomer powder formulation of claim 1, wherein the crosslinking agent is sulfur.

7. The micronized elastomer powder formulation of claim 1, further comprising filler material.

8. The micronized elastomer powder formulation of claim 7, wherein the filler material comprises carbon black, silica, or a combination thereof.

9. The micronized elastomer powder formulation of claim 1, further comprising one or more accelerators.

10. The micronized elastomer powder formulation of claim 9, wherein the one or more accelerators are selected from the group comprising: N-tert-Butyl-2-benzothiazolesulfenamide (TBBS), 1,3-Diphenylguanine (DPG), and combinations thereof.

11. The micronized elastomer powder formulation of claim 1, wherein the plurality of cured elastomer particles comprises at least 0.1% by weight particles of size greater than or equal to 40 mesh.

12. The micronized elastomer powder formulation of claim 1, wherein the plurality of cured elastomer particles comprises at least 30% by weight particles of size less than or equal to 140 mesh.

13. The micronized elastomer powder formulation of claim 1, wherein the plurality of cured elastomer particles comprises at least 10% by weight particles of size greater than or equal to 60 mesh.

14. The micronized elastomer powder formulation of claim 1, wherein the plurality of elastomer rubber particles comprises at least 5% by weight particles of size greater than or equal to 60 mesh.

15. The micronized elastomer powder formulation of claim 1, wherein the plurality of cured elastomer particles comprises at least 15% by weight particles of size greater than or equal to 80 mesh.

16. The micronized elastomer powder formulation of claim 1, further comprising a plurality of chemically modified cured elastomer particles.

17. The micronized elastomer powder formulation of claim 16, wherein the micronized elastomer powder formulation comprises between about 3%-6% by weight cured elastomer particles and about 3%-12% by weight chemically modified cured elastomer particles.

18. The micronized elastomer powder formulation of claim 16, wherein a chemical modification of the plurality of chemically modified cured elastomer particles aids in crosslinking of the particles.

19. The micronized elastomer powder formulation of claim 1, wherein the plurality of cured elastomer particles are produced via a cryogenic grinding process.

20. An elastomer composition for use in manufacturing a cured elastomer product, comprising
    reclaimed elastomer particles having a particle size distribution defined by:
        at least 9% by weight 60 mesh or larger particles;
        at least 21% by weight 80 mesh or larger particles;
        at least 38% by weight 120 mesh or larger particles;
        at least 12% by weight 140 mesh or larger particles; and
        at least 20% by weight particles smaller than 140 mesh.

21. The elastomer composition of claim 20, wherein the elastomer comprises rubber.

22. The elastomer composition of claim 20, further comprising uncured elastomer material.

23. The elastomer composition of claim 20, further comprising a crosslinking agent.

24. The elastomer composition of claim 20, further comprising filler material.

25. The elastomer composition of claim 20, wherein the reclaimed elastomer particles further comprise at least a trace amount by weight of particles size 40 mesh or larger.

26. The elastomer composition of claim 20, further comprising chemically modified vulcanized elastomer particles.

27. The elastomer composition of claim 26, wherein the elastomer composition comprises between about 3%-6% by weight reclaimed elastomer particles and about 3%-12% by weight chemically modified vulcanized elastomer particles.

28. The elastomer composition of claim 26, wherein a chemical modification of the chemically modified vulcanized elastomer particles aids in crosslinking of the particles.

29. The elastomer composition of claim 20, wherein the reclaimed elastomer particles are produced via a cryogenic grinding process.

30. The elastomer composition of claim 20, wherein the cured elastomer product is a vehicle tire.

31. An elastomeric composition, comprising:
uncured elastomer material;
a crosslinking agent; and
between about 3%-8% by composition weight reclaimed elastomer particles, wherein the reclaimed elastomer particles comprise at least 1% by weight particles of size 50 mesh or larger, and wherein the reclaimed elastomer particles comprise at least 20% by weight particles of size 140 mesh or smaller.

32. The elastomeric composition of claim 31, wherein the reclaimed elastomer particles comprise reclaimed cured rubber particles.

33. The elastomeric composition of claim 31, further comprising filler material.

34. The elastomeric composition of claim 31, wherein the reclaimed elastomer particles comprise at least a trace amount by weight of particles size 40 mesh or larger.

35. The elastomeric composition of claim 31, wherein the reclaimed elastomer particles comprise at least 30% by weight particles of size 140 mesh or smaller.

36. The elastomeric composition of claim 31, wherein the reclaimed elastomer particles comprise at least 10% by weight particles of size 60 mesh or larger.

37. The elastomeric composition of claim 31, further comprising chemically modified vulcanized elastomer particles.

38. The elastomeric composition of claim 37, wherein the elastomeric composition comprises between about 3%-12% by weight chemically modified vulcanized elastomer particles.

39. The elastomer composition of claim 37, wherein a chemical modification of the chemically modified vulcanized elastomer particles aids in crosslinking of the particles.

40. The elastomeric composition of claim 31, wherein the reclaimed elastomer particles are produced via a cryogenic grinding process.

* * * * *